WEST & PRICE.
Forge Blower.
No. 70,140.   Patented Oct. 22, 1867.
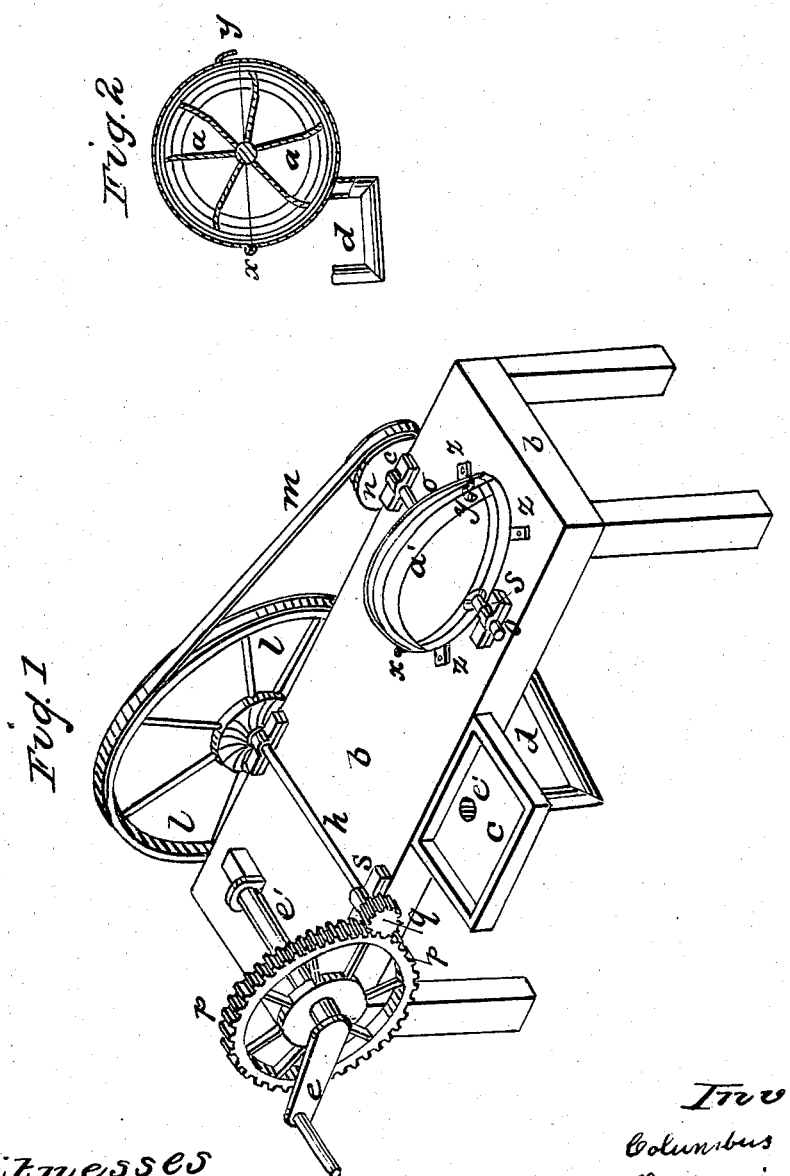

United States Patent Office.

COLUMBUS WEST AND BENJAMIN K. PRICE, OF PITTSBURG, PENNSYLVANIA.

*Letters Patent No. 70,140, dated October 22, 1867.*

IMPROVEMENT IN BLOWERS FOR FORGES.

*The Schedule referred to in these Letters Patent and making part of the same.*

TO ALL WHOM IT MAY CONCERN:

Be it known that we, COLUMBUS WEST and BENJAMIN K. PRICE, of the city of Pittsburg, in the county of Allegheny, and State of Pennsylvania, have invented a new and useful Improvement in Forges, and Apparatus for operating the same; and we do hereby declare the following to be a full, clear, and exact description thereof, reference being had to the accompanying drawings, making a part of this specification, in which—

Figure 1 is a perspective view of the devices we employ, and

Figure 2 a vertical section of the fan and fan-box at right angles to the shaft of the fan.

The nature of our invention consists in a simple and practical method of constructing, arranging, and operating a "hand blast" or fan for blacksmiths' shops and other forges.

We arrange the fan that supplies the draught necessary for the forge, in suitable bearings, in the forward end of the machine. This fan is so encased in a box having a movable top that while it is protected entirely from the dirt, dust, and other impurities so commonly found and frequently met with in the smith's shop, it is also entirely free from the resistance, were it left in an exposed state, that the atmosphere would cause to its revolution. It at the same time is easy of access for repair or any other purpose. We do not, however, construct the fan-box or case perfectly air-tight, for this would deprive our invention of one of its greatest advantages. In the sides of the fan-box there are necessarily openings for the ends of the shaft on which the fan revolves to pass through, as well as to furnish the feed for the fan. We construct these openings of circular or any other form sufficiently large to admit a continuous current of air. Thus the fan-box with its openings, and the supply pipe, when combined, act together on the principle of the ordinary chimney-flue, furnishing the fire with a continuous draught. Practical experience fully attests the importance and value of this feature of our invention. In the ordinary bellows now in use the moment you cease working the lever the current of air is entirely "cut off," so that when the workman leaves the forge, even for a short period, there being no draught, the fire gradually dies out, and, as a consequence, when he again desires to use the forge he is subjected to the delay incident to the rekindling of the fire. This delay in an ordinary shop causes daily a loss of ten per cent. of the workman's time. With our invention it matters not whether the machine is operated or not, there is of necessity a continuous draught supplied to the fire, so that the latter, if it be left for hours, will still continue to burn. Motion is imparted to the fan by means of a simple and practical method of cogged, gearing, fly, and pinion-wheels. These all work in suitable bearings on the top of the frame which supports the entire mechanism. The pinion-wheels can be constructed of such diameter, relative to that of the gear and fly-wheels, that any number of revolutions desired for the fan, with each turn of the crank, can be readily obtained. As commonly constructed, the diameter of the wheels is such that with one revolution of the crank the fan will revolve about sixty times, more or less. The ratio of the diameters of these wheels being properly observed, and the size of the fan-leaves being properly proportioned, a working man can readily produce a sufficient blast of air to operate two or more forges, and do it with less labor than is generally required to work an ordinary blacksmith's bellows. When a greater draught or blast is desired for any purpose than is ordinarily required in a smith's shop, the fly-wheel generally used on our machines can readily be removed, and a larger and heavier one substituted. When this is done the wheel substituted should be constructed with a flange for the belt to work in.

To enable others skilled in the art to make and use our invention, we will proceed to describe its construction and mode of operation.

The fan $a$, enclosed in a fan-box, $a'$, and the machinery employed to drive it, are usually attached to a frame, $b$, made of any convenient size, shape, or material. The forge $c$, also attached to the frame $b$, or located conveniently near it, or distant from it, at pleasure, is of the ordinary construction, with an aperture, $c'$, through which the air is admitted from the pipe $d$, which receives it from the fan-box $a'$, where it is put in motion by the more or less rapid revolutions of the revolving fan $a$. The pipe $d$ is commonly fitted with a tuyere or equivalent device. The power necessarily required to drive the fan $a$ we apply by hand to the crank $e$, whence, by the gear and pinion-wheels $f$ and $g$, it is communicated to the shaft $h$ and large wheel $l$, the latter being usually made of sufficient size and weight to answer the purpose of a fly-wheel. We pass over this the belt $m$, or its equivalent, and also over the pinion-wheel $n$, which is attached to the head of the shaft $o$ of the fan $a$. The crank-shaft $e'$, also the shafts $h$ and $o$, are all placed in proper bearings $s\ s$, of the usual construction, or on friction-rollers or other equivalent device. If it be desired to employ foot instead of hand-power, we operate the crank $e$ by a treadle of the ordinary construction attached to the frame $b$. We also operate the devices described by dog-power, by connecting an endless chain with the crank $e$ or wheel $f$, by any of the appliances in general use for such purposes. In order to secure ease and accuracy in the adjustment of the fan $a$, and for convenience in making repairs, when such may chance to be necessary, we commonly divide the fan-box $a'$ by a horizontal plane passing through it, nearly or quite midway between the top and bottom. The two parts we attach to each other by the hinge $x$ and catch $y$. By these we open and close it at pleasure to make repairs, remove dust, dirt, &c., and can more easily and accurately adjust the fan $a$ on its bearings $s\ s$, as above mentioned. The fan-box $a'$ is attached to the frame $b$ by the straps $z\ z$. The small space required for the stand or frame $b$, the compactness and solidity with which the machinery can be put together, its lightness, and the elements of durability which it possesses, pre-eminently adapt it for use as an improvement on any form of the portable fan or bellows yet devised. The band $m$ is the only part made of perishable material, and this is easily renewed at a trifling cost; whereas in the blacksmith's bellows, as ordinarily constructed, the large quantity of leather necessarily employed fails under constant wear, and is renewed only at considerable cost, and oftentimes with considerable difficulty.

We claim this invention of a portable forge as being especially practicable and convenient for use in large shops, manufacturing establishments, and on public works. In addition to this, we claim it as an improvement in affording the necessary devices by which to apply hand, foot, or dog-power to driving a fan for blacksmith's shop or other forges. The double gearing employed embraces simplicity of construction, is easy of operation, and at the same time furnishes the necessary means for driving a forge with much less labor and exertion than is required by the appliances now in common use.

Having described our invention, what we claim as new, and desire to secure by Letters Patent, is—

1. The combination of a forge, supply pipe, and fan, when the latter is arranged in a box, as shown, and is operated by means of a fly, gear, and pinion-wheels, the whole being constructed, arranged, and operating substantially as described, and for the purposes set forth.

2. The combination of the forge, supply pipe, and fan-box, when the latter is constructed with a movable top and side openings, as shown, and the whole are so arranged that, acting on the principle of the ordinary chimney-flue, they will secure to the forge a continuous current of air, substantially as described.

In testimony whereof we, the said COLUMBUS WEST and BENJAMIN K. PRICE, have hereunto set our hands in presence of—

COLUMBUS WEST,
                       BENJAMIN K. PRICE.

Witnesses:
 ALLAN C. BAKEWELL,
 W. D. LEWIS.